July 21, 1964  E. L. KEENER ETAL  3,141,367
APPARATUS FOR CUTTING ELONGATED ARTICLES TO ACCURATE LENGTH
Filed July 14, 1961  3 Sheets-Sheet 1
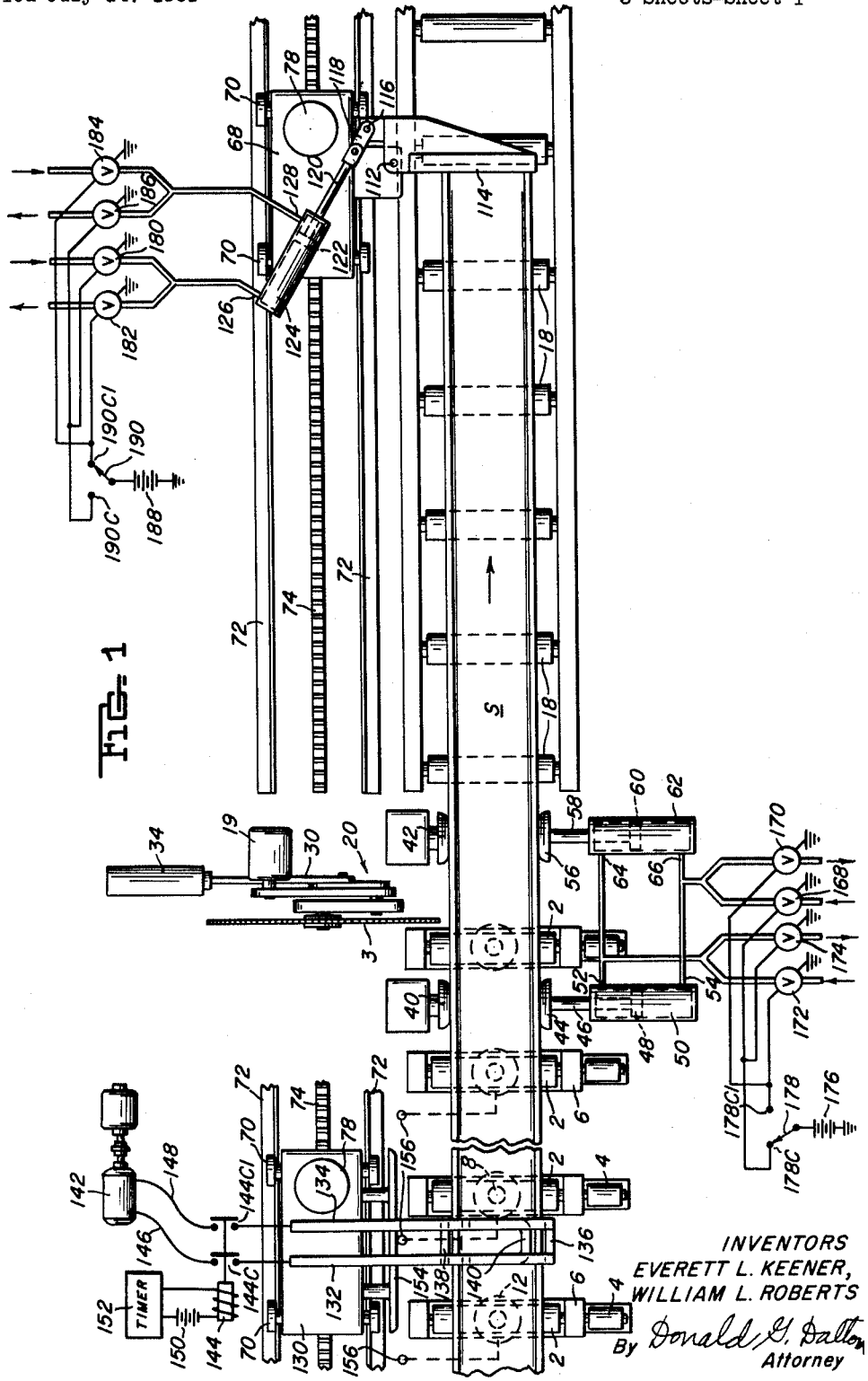
INVENTORS
EVERETT L. KEENER,
WILLIAM L. ROBERTS
By Donald G. Dalton
Attorney

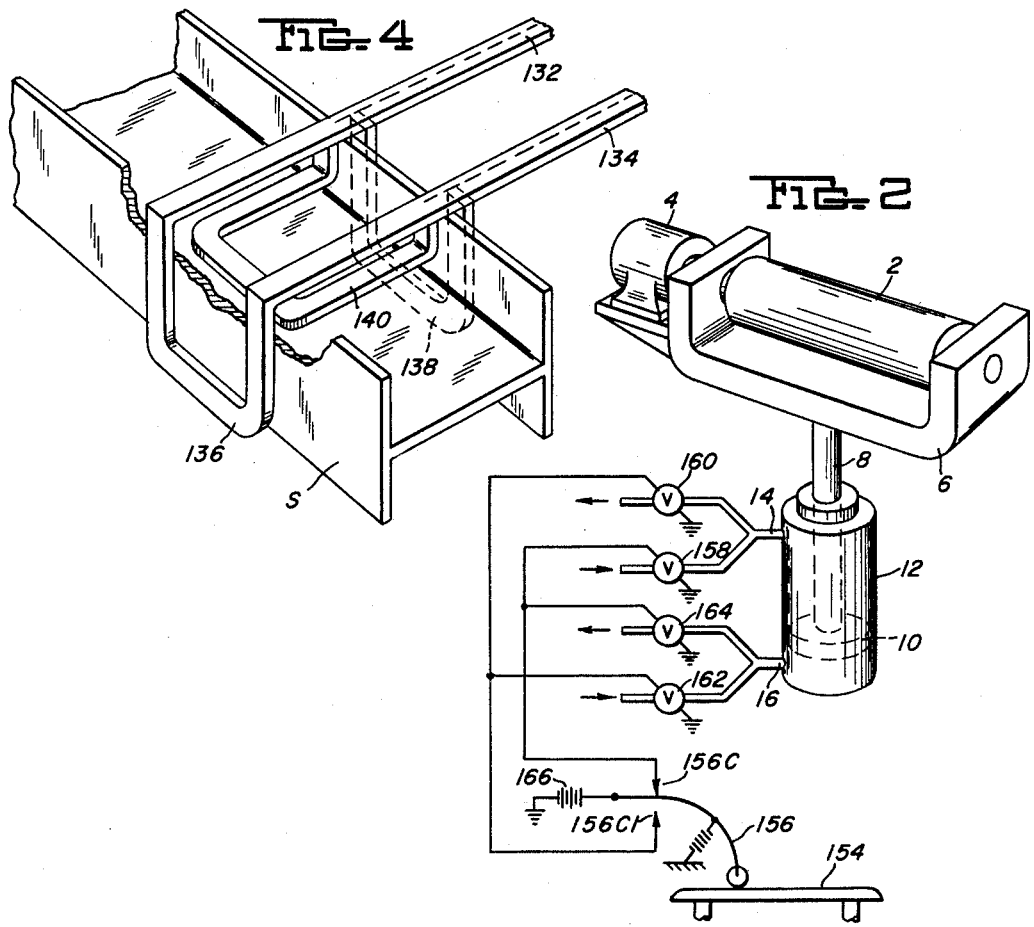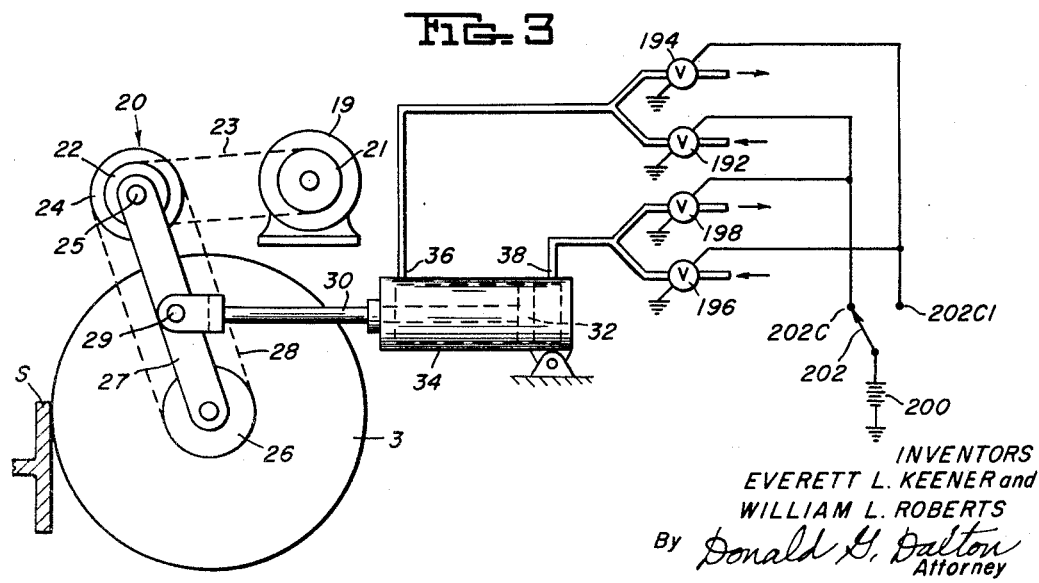

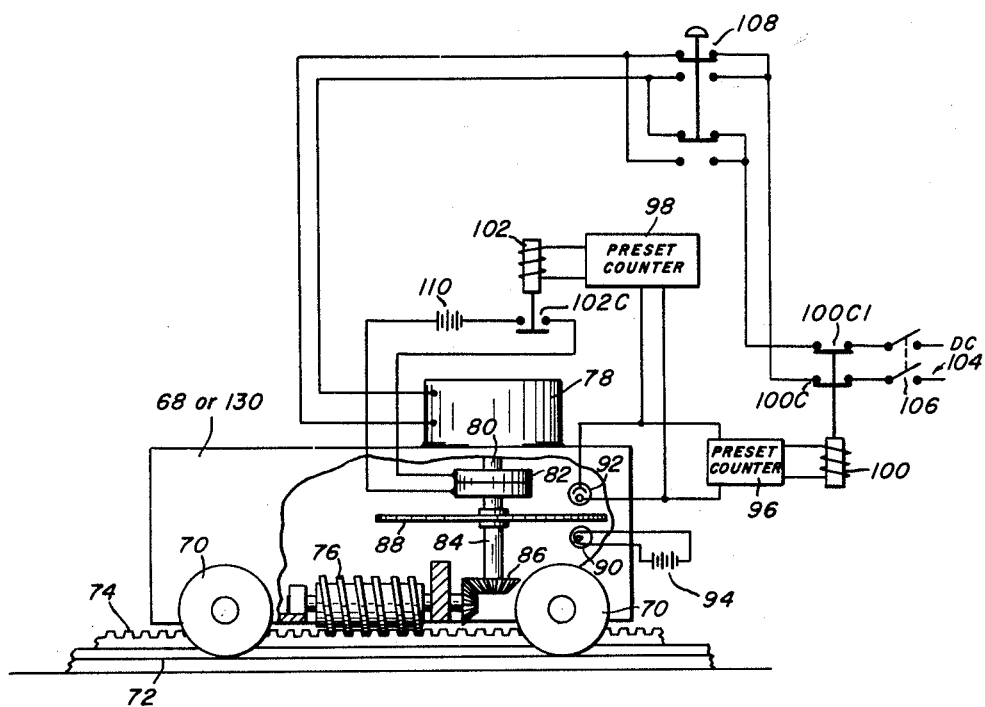

United States Patent Office 3,141,367
Patented July 21, 1964

3,141,367
APPARATUS FOR CUTTING ELONGATED ARTICLES TO ACCURATE LENGTH
Everett L. Keener, Pitcairn, and William L. Roberts, Monroeville, Pa., assignors to United States Steel Corporation, a corporation of New Jersey
Filed July 14, 1961, Ser. No. 124,071
2 Claims. (Cl. 83—170)

This invention relates to apparatus for cutting elongated articles to accurate length and, more particularly, to so cutting cold steel beams.

It is well known that steel may be cut with less power and wear on the saw blade or shear when the steel is hot than when it is cold. Therefore, when accuracy is not of great importance, a steel structural member is cut to length immediately upon emergence from the finishing stand of the rolling mill while it is still hot. Because the beam will shrink on cooling, it is necessary to cut it longer than desired so that the cool beam will be of adequate length. Due to the unpredictability of the exact amount of shrinkage, the cooled length often exceeds the desired length so that waste occurs as a result or may be too short so that the workpiece cannot be used for the desired purpose.

It is therefore an object of our invention to provide apparatus whereby articles may be cut after they are cool by heating only a small portion at the location where the cut is to be made.

This and other objects will be more apparent after referring to the following specification and attached drawings, in which:

FIGURE 1 is a plan view of the apparatus of our invention showing some of the controls therefor;
FIGURE 2 is a perspective view of a lifting roll and its control;
FIGURE 3 is a schematic view of the saw and its control;
FIGURE 4 is a perspective view of a workpiece and heating apparatus; and
FIGURE 5 is a schematic view of a carriage and its controls.

Referring more particularly to the drawings, reference numeral 2 indicates conveyor rolls which transport a structural member S from storage to a saw 3. Each roll 2 is individually powered by a motor 4 and is supported for rotation on a member 6 in conventional bearings, not shown. As shown in FIGURE 2, the member 6 is supported on one end of a rod 8, the other end of which is connected to a piston 10 in a pneumatic cylinder 12. Ports 14 and 16 are provided in the ends of the cylinder 12 for feeding in and exhausting air. Conveyor rolls 18 are provided at the exit side of saw 3 for transporting the workpiece S away from the saw after it has been cut to the desired length. As best shown in FIGURE 3, the saw 3 is powered by a motor 19 through a belt drive 20. The belt drive 20 includes a fixed pulley 21 driven by motor 19, a fixed pulley 22 driven from pulley 21 by belt 23, a fixed pulley 24 mounted on shaft 25 for rotation with pulley 22, a pulley 26 mounted on the end of an arm 27 which is pivotally mounted on shaft 25, and a belt 28 extending around pulleys 24 and 26. The saw 3 is arranged for rotation with pulley 26. A pin 29 is mounted on arm 27 intermediate the length thereof. The pin 29 is received in a clevis at one end of a rod 30, the other end of which is attached to a piston 32 of a pivotally-mounted pneumatic cylinder 34. Ports 36 and 38 are provided in opposite ends of the cylinder 34 for feeding in and exhausting air.

A guide 40 is provided on the entry side of saw 3 and a guide 42 on the exit side thereof. Opposing the guide 40 is a ram 44 attached to one end of a rod 46, the other end of which is attached to a piston 48 of a pneumatic cylinder 50. Ports 52 and 54 are provided in opposite ends of the cylinder 50 for feeding in and exhausting air. Opposing the guide 42 is a ram 56 attached to one end of a rod 58, the other end of which is attached to a piston 60 of a pneumatic cylinder 62. Ports 64 and 66 are provided in opposite ends of the cylinder 62 for feeding in and exhausting air.

A carriage 68 is arranged for travel along a path parallel to the path of travel of the workpiece S on the exit side of saw 3. The carriage 68 has wheels 70 which guide it along rails 72. As best shown in FIGURE 5, a rack 74 between the rails 72 is in mesh with a worm gear 76 carried by the carriage 68. The worm gear 76 is driven by a motor 78 through a shaft 80, a magnetically-operated gear box 82, a shaft 84, and a set of bevel gears 86. Gear box 82 is a conventional device which directly connects shafts 80 and 84 when not electrically energized and reduces the speed of shaft 84 with respect to the speed of shaft 80 when electrically energized. A perforated disk 88 is attached to the shaft 84. A light source 90 and phototube 92 are arranged on opposite sides of disk 88. The perforations in the disk 88 are so spaced that for each ⅛ inch of travel of the carriage 68, one hole passes between light source 90 and phototube 92. The light source 90 is supplied with power from a battery 94. The phototube 92 is connected to the input of two electronic preset counters 96 and 98 which are conventional devices such as Model Number 5425 described in section 1–18 of Catalog 705, 1957 of Beckman Berkeley Division of Beckman Instruments, Inc. The output of the counter 96 is connected to relay coil 100 having normally closed contacts 100C and 100C1. The output of the counter 98 is connected to relay coil 102 having normally open contact 102C. Power is supplied to the motor 78 from a D.C. power source 104 through an on-off switch 106, contacts 100C and 100C1, and a reversing switch 108. Power is supplied to the magnetically-operated gear box 82 from a battery 110 through the contact 102C. Attached to the carriage 68 for rotation about a pin 112 is a stop 114. The stop 114 carries a pin 116 which is received in one end of a link 118. The other end of the link 118 is pivotally attached to one end of a rod 120, the other end of which is attached to a piston 122 of a pneumatic cylinder 124. The cylinder 124 is rigidly attached to the carriage 68 and has ports 126 and 128 at its opposite ends.

A carriage 130 is arranged on the entry end of saw 3 for travel along a path parallel to the path of travel of the workpiece S. The carriage 130 is substantially the same as the carriage 68 and is equipped with the same elements as those bearing reference numerals 70 to 110 inclusive. Attached to, but insulated from, the carriage 130 are conducting bars 132 and 134 the ends of which protrude over the workpiece S. As best shown in FIGURE 4, three hairpin coils 136, 138 and 140 each have one end connected to the bar 132 and the other end to the bar 134. The coils 136 and 138 are positioned so as to receive the flanges of the workpiece S therebetween, and the coil 140 is arranged to be received within the flanges adjacent the web of the workpiece S. The conducting bars 132 and 134 are supplied with power from motor-generator set 142 through normally open contacts 144C and 144C1 of a relay having a coil 144 and through long flexible cables 146 and 148. Motor-generator set 142 is a conventional device in which the motor is powered from a 3-phase, 60 cycle source and the generator is constructed to produce a high frequency voltage in the range of 1,500 to 10,000 cycles per second. We have found that a frequency of approximately 3,000 cycles per second is preferable. The relay coil 144 is energized by a battery 150 through the contacts of a conventional timer 152 which is capable of closing its contacts for a preselected period of time, preferably for approximately 20 seconds when the structural member S is made of steel. An example of a commercially available timer 152 is Item No. 6–663–5 of the Fisher Scientific Company.

A cam surface 154 is mounted on the carriage 130 to operate switches 156, one of which is associated with each roll 2. Each switch 156 has contacts 156C and 156C1. As shown in FIGURE 2 the port 14 in cylinder 12 is alternately connected to a high pressure air supply through an electrically operated valve 158 and to exhaust through an electrically operated valve 160. In similar fashion, the port 16 is alternately connected to a high pressure air supply through an electrically operated valve 162 and to exhaust through a valve 164. Electric power is supplied to the valves 158 and 164 from a power source 166 through contact 156C and alternately to valves 160 and 162 through contact 156C1. While only one control is shown on the drawing it will be understood that each roll 2 is similarly provided with a control.

The ports 54 and 66 of cylinders 50 and 62, respectively, are alternately connected to a common high pressure air supply through an electrically operated valve 168 and to exhaust through an electrically operated valve 170. The ports 52 and 64 are alternately connected to a common high pressure air supply through an electrically operated valve 172 and to exhaust through an electrically operated valve 174. Power is supplied to the valves 168 and 174 from a power source 176 through contact 178C of a single pole, double throw switch 178. The switch 178 also has a contact 178C1 through which power is supplied to valves 170 and 172 from the power source 176.

The port 126 of cylinder 124 is alternately connected to a high pressure air supply through an electrically operated valve 180 and to exhaust through an electrically operated valve 182. The port 128 is alternately connected to a high pressure air supply through an electrically operated valve 184 and to exhaust through an electrically operated valve 186. Power is supplied to the valves 180 and 186 from a power source 188 through a contact 190C of a single pole, double throw switch 190 and to valves 182 and 184 through a contact 190C1 of the switch 190.

The port 36 (FIGURE 3) of cylinder 34 is alternately connected to a high pressure air supply through an electrically operated valve 192 and to exhaust through an electrically operated valve 194. The port 38 is alternately connected to a high pressure air supply through an electrically operated valve 196 and to exhaust through an electrically operated valve 198. Power is supplied to the valves 192 and 198 from a power source 200 through a contact 202C of a single pole, double throw switch 202 and to valves 194 and 196 through contact 202C1 of switch 202. The valves 158, 160, 162, 164, 168, 170, 172, 174, 180, 182, 184, 186, 192, 194, 196, and 198 are conventional valves so constructed that they are closed to air flow when deenergized electrically.

The operation of our device is as follows:

Before a beam is conveyed onto the apparatus, carriage 130 is moved in as close as possible to saw 3 by operation of switches 106 and 108 associated with carriage 130. The switch 190 may then be operated to close contact 190C so that stop 114 is lowered into operative position and switch 178 is operated to close contact 178C1 to retract rams 44 and 56. A beam S is then conveyed onto the entry end of the apparatus and moved forwardly until the portion to be heated is positioned at coils 136, 138 and 140. Timer 152 is set at approximately 20 seconds and power is supplied to coils 136, 138 and 140 for that period of time to heat the end of the beam S to about 1400° F. The beam is then moved to position the heated portion under the saw 3 at which time switch 178 is operated to close contact 178C and move rams 44 and 56 inwardly to clamp beam S against guides 40 and 42 in sawing position. Switch 202 is then operated to close contact 202C1 so that the saw 3 will cut off the end of beam S square. While the sawing is taking place, the apparatus is set up for the next cut which will be assumed to be for a 30-foot length. There are 2,880 one-eighth inch lengths in 30 feet and that number is preset into counter 96 by operation of the preset push buttons thereon. The number 2832 is preset on counter 98 which represents a length of 29½ feet. The counters associated with carriage 130 are similarly preset. Switch 108 is then reversed and switch 106 is closed so as to supply power to motor 78 and cause the carriage 68 to move away from the saw 3. For each one-eighth inch of travel of carriage 68, one pulse is fed to the counters 96 and 98 from phototube 92 cooperating with light 90 and perforated disk 88. When the carriage 68 has traveled 29½ feet, the counter 98 will generate an output signal which will energize relay coil 102 and close contact 102C. Electromagnetic gear box 82 is thereby energized so that the speed of carriage 68 is reduced although motor 78 rotates at its same speed. Movement of carriage 68 at the reduced speed continues until forty-eight more pulses are generated by phototube 92, at which time counter 96 generates a signal to energize relay coil 100 which opens contacts 100C and 100C1 and stops motor 78 at a carriage distance of 30 feet from the saw 3. In an identical manner, the carriage 130 is moved to a position 30 feet from the saw 3 on the entry side. Should carriage 130 stop over a conveyor roll 2, such roll is lowered to protect it from the intense heat generated by coils 136, 138 and 140. The cam surface 154 on carriage 130 operates the switch 156 to close contact 156C which, in turn, opens valves 158 and 164 associated with the particular cylinder 10 and roll 2. Since each roll 2 has associated with it a switch 156, only the roll directly beneath the coils 136, 138 and 140 will be depressed. While the carriages 68 and 130 are moving into positions 30 feet from the saw 3, the end of beam S is sawed off and power is supplied to coils 136, 138 and 140 so as to heat a portion of beam S 30 feet from the end thereof. After switch 178 is operated to close contact 178C1 and retract the rams 44 and 56, conveyor rolls 2 and 18 are energized to move beam S forwardly until it encounters stop 114. Operation of switch 178 to close contact 178C actuates rams 44 and 56 to hold the beam for sawing, which is then initiated by operation of switch 202 and closure of contact 202C1. If the next length to be cut from the beam is of the same length, power is supplied to coils 136, 138 and 140 by operation of timer 152 while saw 3 is making its cut. When the cut is completed, switch 202 is operated to close contact 202C and retract saw 3, and switch 190 is operated to close contact 190C1 to retract the stop 114. Then, when rams 44 and 56 are retracted by operation of switch 178 and closure of contact 178C1, the 30-foot length may be transported away on rolls 18 to a storage area, not shown. Stop 114 is thereafter reset by operation of switch 190 to close contact 190C, the beam S is moved until it strikes the stop 114 and the heated portion is then in position for another cut by saw 3. If the next piece to be cut from beam S is to be, say 45 feet, the carriages 68 and 130 must be moved out to a distance of 45 feet on either side of the saw 3. This is accomplished by presetting the number 4320 on counter 96 and on its equivalent associated with carriage 130 and the number 4272 on the counter 98 and on its equivalent associated with carriage 130. Closure of switch 106 causes each carriage 68 and 130 to move outward until each is 44½ feet from saw 3 at which time electro-magnetic gear box 82, and its equivalent on carriage 130, operate to slow the carriages which are stopped by the opening of contacts 106 after having traveled an additional 6 inches at a slower rate. The steps of heating a portion of beam S 45 feet from saw 3 while a cut is being made, retracting saw 3, retracting rams 44 and 56, and clearing stop 114 are then repeated as heretofore described. Although in the foregoing description we have used the location of saw 3 as the reference point for measuring length of travel of carriages 68 and 130, it should be understood that any point may be used as a reference. The shape and position of the coils 136, 138 and 140 may be altered to accommodate various sizes and shapes of materials.

While one embodiment of our invention has been shown and described, it will be apparent that other adaptations and modifications may be made without departing from the scope of the following claims.

We claim:

1. Apparatus for cutting elongated articles to accurate length comprising a conveyor for moving said article longitudinally, cutting means adjacent said conveyor intermediate the length thereof, a first carriage on the entry side of said cutting means mounted for movement parallel to said conveyor, a second carriage on the exit side of said cutting means mounted for movement parallel to said conveyor, heating means mounted on said first carriage for heating a relatively small longitudinal portion of said article across its width while maintaining the remainder of the article relatively cold, a stop mounted on said second carriage for movement into and out of the path of travel of articles on said conveyor, means for moving said carriages predetermined and substantially equal distances from said cutting means, means for supplying heat to said heating means when the first carriage is stopped at said last named position, means for moving said article when locally heated along said conveyor until it reaches said stop, and means for moving said cutting means transversely entirely through the heated portion of said article at said last named position.

2. Apparatus for cutting elongated articles to accurate length comprising a conveyor for moving said article longitudinally, cutting means adjacent said conveyor intermediate the length thereof, a first carriage on the entry side of said cutting means mounted for movement parallel to said conveyor, a second carriage on the exit side of said cutting means mounted for movement parallel to said conveyor, heating means mounted on said first carriage for heating a relatively small longitudinal portion of said article across its width while maintaining the remainder of the article relatively cold, a stop mounted on said second carriage for movement into and out of the path of travel of articles on said conveyor, article clamping means adjacent said cutting means, means for moving said carriages predetermined and substantially equal distances from said cutting means, means for supplying heat to said heating means when the first carriage is stopped at said last named position, means for moving said article when locally heated along said conveyor until it reaches said stop, means for moving said clamping means to operative position to clamp said article in said last named position, and means for moving said cutting means transversely entirely through the heated portion of said clamped article.

References Cited in the file of this patent

UNITED STATES PATENTS

| | | |
|---|---|---|
| 850,485 | Ott | Apr. 16, 1907 |
| 1,455,988 | Bracken | May 22, 1923 |
| 1,872,424 | Drake | Aug. 16, 1932 |
| 1,965,620 | Vogt | July 10, 1934 |
| 2,235,532 | Reardon | Mar. 18, 1941 |
| 2,272,215 | Lockett | Feb. 10, 1942 |
| 2,324,737 | Stevens et al. | July 20, 1943 |
| 2,358,772 | Brow et al. | Sept. 26, 1944 |
| 2,521,352 | Dockerty et al. | Sept. 5, 1950 |
| 2,552,137 | Grieder | Oct. 23, 1951 |